United States Patent [19]

Yasui

[11] Patent Number: 4,697,935
[45] Date of Patent: Oct. 6, 1987

[54] CROSSED-ROLLER RETAINER
[75] Inventor: Toru Yasui, Gifu, Japan
[73] Assignee: Nippon Thompson, Co. Ltd., Tokyo, Japan
[21] Appl. No.: 861,691
[22] Filed: May 9, 1986
[30] Foreign Application Priority Data
  May 10, 1985 [JP] Japan .................................. 60-97970
[51] Int. Cl.⁴ ............................................ F16C 29/04
[52] U.S. Cl. .................................................... 384/47
[58] Field of Search ..................... 384/47, 447, 619, 42
[56] References Cited
U.S. PATENT DOCUMENTS
  2,242,498  5/1941  Zwick ................................... 384/47
  3,960,413  6/1976  Abbuhl et al. ........................ 384/47
  4,215,904  8/1980  Teramachi .......................... 384/47

Primary Examiner—Lenard A. Footland
Attorney, Agent, or Firm—Alan H. MacPherson; Richard Franklin; Thomas S. MacDonald

[57] ABSTRACT

A retainer particularly suitable for use in a crossed-roller rolling contact bearing assembly is provided. The retainer is comprised of a thin plate which is provided with at least one hole for locating therein a roller. A pair of top and bottom projections are formed in the hole for providing main contact surfaces for holding the roller in position by surface contact. Additionally, the wall which defines the hole is provided with a double-tapered section at least partly, and this double-tapered wall section provides auxiliary contact surfaces for holding the roller in position by surface contact.

9 Claims, 8 Drawing Figures

CROSSED-ROLLER RETAINER

BACKGROUND OF THE INVENTION

1. Field of the Invention

This invention generally relates to a rolling contact bearing assembly, and, in particular, to a crossed-roller retainer for use in a crossed-roller type rolling contact bearing assembly.

2. Description of the Prior Art

A crossed-roller type bearing assembly is well known in the art, and it generally includes a stationary member provided with a V-shaped groove and a moving member also provided with a V-shaped groove opposite to the V-shaped groove of the stationary member. A plurality of rollers are interposed between the stationary and moving members as fitted in and in rolling contact with the V-shaped grooves of the stationary and moving members, thereby allowing the moving member to move relative to the stationary member in the direction parallel to the longitudinal direction of the V-shaped grooves. The rollers fitted in a roller runway defined by the oppositely arranged V-shaped grooves are arranged such that the two adjacent ones are oriented with their axes of rotation extending perpendicular to each other when viewed in the longitudinal direction of the roller run way. It is called the crossed-roller type because the axes of rotation of the two adjacent rollers are crossed.

Also provided in such a crossed-roller type bearing assembly is a crossed-roller retainer for retaining the rollers in position. Such a retainer is normally in the shape of a plate and it is provided with a plurality of holding holes spaced apart from each other. In the prior art crossed-roller retainer for retaining the rollers in the crossed arrangement, the holding holes were formed by machining with plastic deformation, and the peripheral walls of the holding holes formed in the retainer plate were almost perpendicular to either surface of the retainer plate. However, since the rollers placed in the holding holes of the retainer plate are inclined with respect to either surface of the retainer plate, each of the rollers defines a line contact with the wall of the corresponding one of the holding holes. Such a line contact between the roller and the wall of the holding hole, however, is not advantageous because of lack of stability. In particular, in the case of a miniature type bearing assembly, this can be critical because the retainer plate in this case is very thin and in the order of 0.2 mm for the rollers having the diameter of approximately 2 mm and there is a possibility of rollers slipping away from the retainer plate. Besides, the prior art retainer plate was low in dimensional accuracy largely due to the fact that it was machine-processed. Such a low dimensional accuracy could then cause an increase in resistance force.

SUMMARY OF THE INVENTION

In accordance with the present invention, there is provided a crossed-roller retainer for use in a crossed-roller type bearing assembly, which includes a retainer plate provided with a plurality of holding holes, each of which has a double-tapered wall. The provision of such a double-tapered wall allows definition of a surface contact with the roller fitted in the corresponding holding hole. That is, the wall of each of the holding holes formed in the retainer plate of the present invention is not perpendicular to either surface of the retainer plate, but it is inclinsd at a first angle with respect to one surface of the retainer plate and it is also inclined at a second angle with respect to the other surface. In the preferred embodiment, the first and second angles are substantially the same in magnitude but opposite in orientation. In other words, the wall of the holding hole in the present invention has two slopes each of which extends from the corresponding surface of the retainer plate at an angle. Thus, when viewed in cross section, the wall of the holding hole has an inwardly extending triangular ridge.

In the preferred embodiment, the holding holes are formed in the retainer plate by an etching technique. Because of the occurrence of undercutting when etching is carried out, the wall of each of the holding holes will have the shape of an inwardly extending ridge. The application of etching to form the holding holes is preferable because it can minimize the application of mechanical force to the retainer plate during processing, so that the dimensional accuracy may be enhanced significantly. It should be noted that etching should be carried out from either surface of the retainer plate in forming the holding holes so as to form an inwardly extending ridge shaped wall.

It is therefore a primary object of the present invention to obviate the disadvantages of the prior art as described above and to provide a novel crossed-roller retainer plate for use in a crossed-roller type bearing assembly.

Another object of the present invention is to provide a crossed-roller retainer plate high in dimensional accuracy, reproducibility and performance.

A further object of the present invention is to provide a crossed-roller retainer plate having an enhanced stability in holding rollers in crossed arrangement.

Other objects, advantages and novel features of the present invention will become apparent from the following detailed description of the invention when considered in conjunction with the accompanying drawings.

DESCRIPTION OF THE PREFERRED EMBODIMENTS

Figure 1:
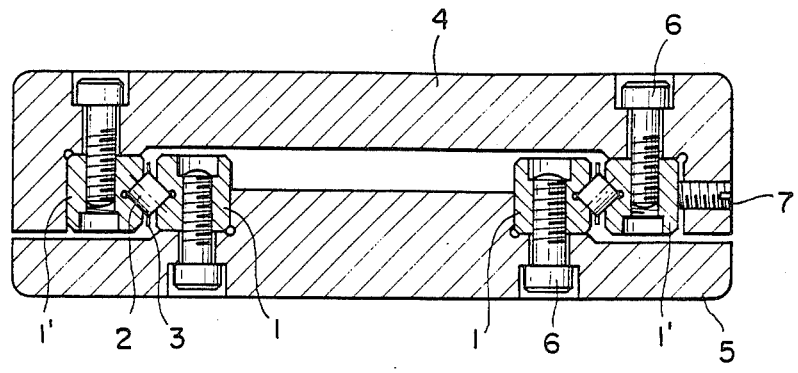
FIG. 1 is a cross-sectional view showing a rolling-contact type bearing assembly constructed by using a crossed-roller retainer embodying the present invention.

FIG. 1 shows a crossed-roller type rolling contact bearing assembly constructed in accordance with one embodiment of the present invention. As shown, the assembly includes a bed 5, which is elongated in shape and extends over a predetermined length, and a table 4 which is mounted on the bed 5 so as to move with respect thereto along the longitudinal direction of the bed 5. In the illustrated embodiment, both of the bed 5 and the table 4 are flat and symmetrical in shape with respect to the longitudinal center line. Although it should not be so limited, either one of the bed 5 and the table 4 may be fixedly mounted on a stationary object, if desired.

A pair of inner rail members 1, 1 are fixedly mounted on top surface of the bed 5 as spaced apart from each other over a predetermined distance by means of bolts 6. Each of the inner rail members 1, 1, is elongated in shape and provided with an inner V-shaped guide groove at one surface thereof. The pair of inner rail members 1, 1 are fixedly mounted on the bed 5 such that the surface provided with the inner V-shaped guide groove is located at the outer side. The table 4 is provided with a pair of outer rail members 1', 1' which are spaced apart from each other. These outer rail members 1', 1' are also fixedly mounted on the table by means of bolts 6. Each of the outer rail members 1', 1' is also elongated in shape and provided with an outer V-shaped guide groove. Thus, when assembled, the outer V-shaped guide groove is located to face the corresponding inner V-shaped guide groove to define a roller runway generally square in shape therebetween. A plurality of rollers 2 are fitted in the roller runway defined between the paired inner and outer V-shaped grooves, so that a rolling contact is provided between the table 4 and the bed 4, thereby providing a relative movement between the table 4 and the bed 5.

Figure 2:
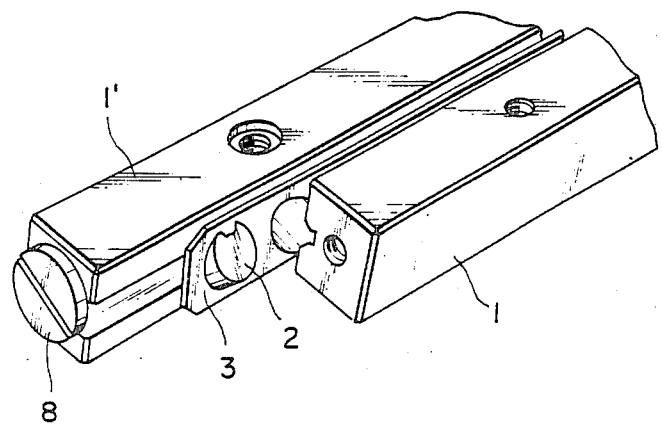
FIG. 2 is a fragmentary, perspective view showing a part of the structure shown in FIG. 1.

It is to be noted that the rollers 2 are fitted in the roller runway defined between the paired inner and outer V-shaped guide grooves in a crossed arrangement. That is, any two adjacent rollers 2 and 2 are arranged such that their axes of rotation are crossed or extend in directions perpendicular to each other. In other words, the rollers 2 are arranged in the roller runway such that their alternate axes of rotation are rotated 90° around the center of the roller runway. In this arrangement, the four surfaces of the paired inner and outer V-shaped guide grooves, which, in effect, define a roller runway, are effectively used as guide surfaces along which the rollers 2 roll. Also provided in the assembly of FIG. 1 is a crossed-roller retainer 3 which is generally in the shape of an elongated thin plate. As shown in FIG. 2, the crossed-roller retainer 3 is provided with a plurality of holding holes for holding therein the rollers 2. With the provision of the crossed-roller retainer 3, the rollers 2 in a crossed arrangement are held in position as spaced apart from each other. The rollers 2 are rotatably held in the holding holes of the retainer 3, so that the rollers 2 can still roll along the V-shaped guide grooves. As also shown in FIG. 2, a stopper screw 8 is provided at each end of the rail member to block the V-shaped guide groove at each end, thereby preventing the rollers 2 from slipping away from the assembly.

Figure 3:
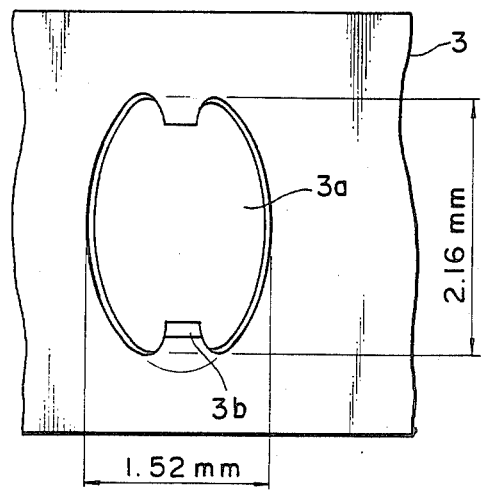
FIG. 3 is a fragmentary, front view showing a crossed-roller retainer plate constructed in accordance with one embodiment of the present invention.
Figure 4:
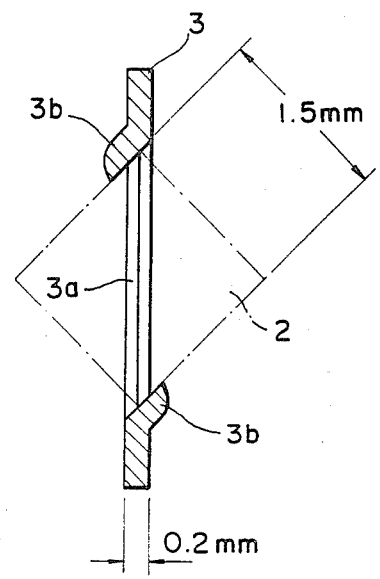
FIG. 4 is a vertical cross-sectional view of the crossed-roller retainer plate shown in FIG. 3.
Figure 5:
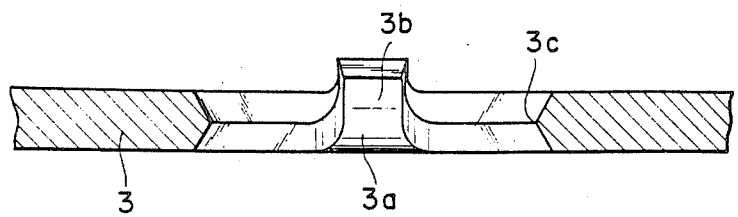
FIG. 5 is a horizontal cross-sectional view of the crossed-roller retainer plate shown in FIG. 3.

FIG. 3 shows in detail a part of the retainer 3 employed in the rolling contact bearing assembly shown in FIGS. 1 and 2. FIG. 4 is a transverse or vertical, cross-sectional view of the retainer 3 taken at the vertical center line of the holding hole 3a, and FIG. 5 is a longitudinal or horizontal, cross-sectional view of the retainer 3 taken at the horizontal center line of the holding hole 3a. The retainer 3 is generally rectangular in shape and is preferably comprised of a relatively thin plate of any desired material, such as a metal. The retainer 3 is provided with a plurality of holding holes 3a, only one of which is shown in FIG. 3, for holding the rollers 2 in a crossed arrangement. The holding hole 3a has a desired shape so as to hold the corresponding roller 2 rotatably therein. In the illustrated embodiment, the holding hole 3a is generally oval-shaped, though the holding hole 3a of the present retainer 3 should not be limited only thereto. Of importance, the holding hole 3a has a double-tapered wall 3c as best shown in FIG. 5. Thus, the wall 3c of the holding hole 3a is not perpendicular to either surface of the retainer 3, and, instead, the wall 3c has two slopes which define an inwardly extending ridge.

The holding hole 3a is also provided with a pair of top and bottom inwardly extending projections 3b and 3b. These projections 3b and 3b are formed from a part of the retainer 3 and they are bent in desired directions. That is, as shown in FIG. 4, the top projection 3b is bent to the left of the retainer 3 and the bottom projection 3b is bent to the right of the retainer 3. These projections 3b and 3b are bent such that their inner surfaces are generally in parallel with a pair of opposite surfaces of the roller runway along which the roller 2 rolls. Specific dimensional values of the long and short axes of the oval-shaped holding hole 3a and the roller 2 are indicated in FIGS. 3 and 4 only for illustrative purpose. In the illustrated embodiment, the roller 2 has a height which is equal in size to its diameter.

As described above, since the wall 3c of the holding hole 3a is double-tapered to define an inwardly extending ridge, when the roller 2 is fitted into the holding hole 3a as indicated by the one-dotted line in FIG. 4, the roller 2 is held in position not only by the top and bottom projections 3b, 3b, but also by the engagement with the double-tapered wall 3c. That is, those portions of the double-tapered wall 3c which are horizontally aligned with the top and bottom projections 3b, 3b provide contact surfaces to which the roller 2 may come into contact. In this case, those portions of the double-tapered wall 3c, providing contact surfaces, may define a surface contact with the roller 2, so that the roller 2 may be held in position more stably with the present structure. In other words, with the provision of the double-tapered wall 3c, the total area of the contact surfaces for holding the roller 2 in position is increased. It should also be noted that, in a crossed-roller arrangement, since the rollers 2 are alternately arranged as rotated 90° around the direction of travel the top and bottom projections 3b, 3b must be bent in opposite directions alternately. That is, for the holding hole 3a which is located next to the one shown in FIG. 3, the top projection 3b must be bent to the right and the bottom projection 3b must be bent to the left, as different from the one shown in FIG. 4. However, in each of the holding holes 3a, the roller 2 may be held not only by the contact surfaces presented by the top and bottom projections 3b, 3b, but also by the contact surfaces presented by portions of the inwardly extending ridge-shaped wall 3c, so that all of the rollers 2 in a crossed arrangement may be held in position with increased stability.

Preferably, the double-tapered wall 3c is defined when the holding hole 3a is formed in the retainer 3 by etching. That is, if the holding hole 3 is formed by etching from both sides, then the double-tapered wall 3c is automatically defined because of the effect of undercutting. Thus, there is no special step for forming the double-tapered wall 3c, and what is required is to use an etching technique which provides a sufficient undercutting so as to permit definition of the double-tapered wall 3c when the holding hole 3a is etched in the retainer 3. Since etching itself is well known in the art, it will not be described in detail here. As shown in FIG. 5, the height of the double-tapered wdll 3c formed by etching from both sides is typically within 20% of the thickness of the retainer 3.

Figure 6A:
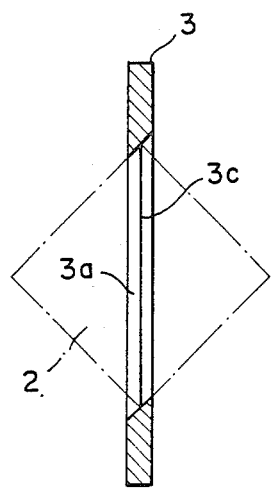
FIGS. 6a and 6b are schematic illustrations showing another embodiment of the present invention.
Figure 6B:
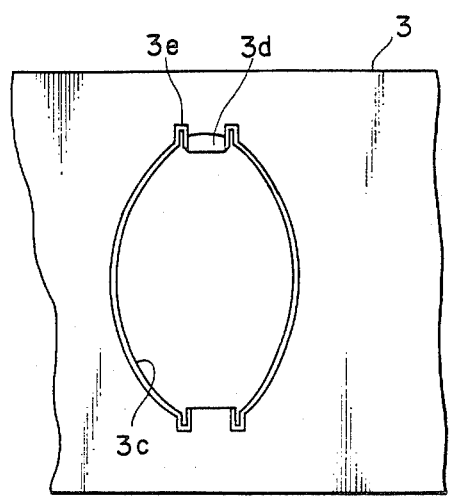

FIGS. 6a and 6b show a crossed-roller retainer 3 constructed in accordance with another embodiment of the present invention. The retainer 3 of this embodiment differs from the previous embodiment because it does not have a bent projection. That is, the retainer 3 of the present embodiment is also generally rectangular in shape and comprised of a relatively thin plate of a desired material, such as a metal. The retainer plate 3 is provided with a plurality of holding holes 3a as spaced apart from each other at a predetermined pitch. The holding hole 3a is generally elliptic in shape and it has a double-tapered wall 3c similar to the previous embodiment. The holding hole 3a is also formed with a pair of top and bottom projections 3d, 3d, but, as different from the previous embodiment, these projections 3d, 3d are not bent. As a result, the retainer 3 has a thickness determined by the thickness of the plate itself, which can be very small.

In the embodiment shown in FIGS. 6a and 6b, each of the top and bottom projections 3d, 3d is formed with a single taper at its end. That is, as best shown in FIG. 6a, the top projection 3d is formed with a single taper sloping down from right to left and the bottom projection 3d is formed with a single taper also sloping down from right to left. Such single tapered ends may be formed by etching the ends of the projections from one surface or by any other method. Thus, the tapered ends of these projections 3d, 3d provide parallel contact surfaces for holding the roller 2 in position. At the same time, the roller 2 is also held in position by other contact surfaces defined by those portions of the double-tapered wall 3c which are located generally horizontal with the top and bottom projections 3d, 3d. Similar to the previous embodiment, the direction of the taper provided at the end of each of the projections 3d, 3d must be turned 90° alternately so as to accommodate the rollers 2 in a crossed arrangement.

Figure 7:
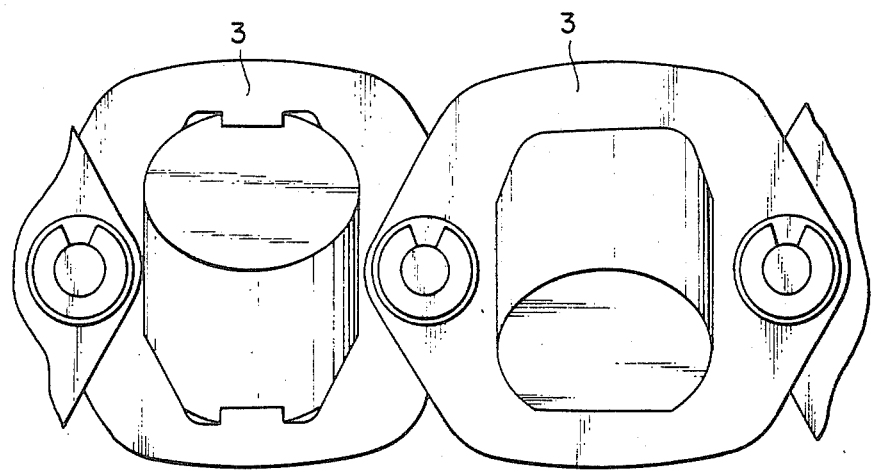
FIG. 7 is a schematic illustration showing a retainer plate constructed in accordance with a further embodiment of the present invention when applied in a rolling contact type bearing assembly having unlimited linear motion.

FIG. 7 shows a crossed-roller retainer 3 constructed in accordance with a further embodiment of the present invention. As shown, the retainer 3 is also in the form of a relatively thin plate and is provided with a single holding hole for holding the corresponding roller in position, and a plurality of such retainers 3 are flexibly coupled in an end-to-end arrangement. This embodiment is suitable for use in a crossed-roller rolling contact bearing assembly of the unlimited linear motion type. That is, in a rolling contact bearing assembly of the unlimited linear motion type, an endless roller runway is defined for the rollers in crossed arrangement to travel without limitation, and, thus, the retainer must be flexible so as to be capable of following the circular movement of the roller along the endless path. In order to provide such a flexibility, the retainer 3 is formed to have a generally hexagonal outer shape and only one holding hole with a double-tapered wall is defined in the retainer 3. And, a plurality of such retainers 3 are flexibly connected in an end-to-end relation using connection pins in a chain-like manner.

While the above provides a full and complete disclosure of the preferred embodiment of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A plate-shaped retainer for retaining a roller in an inclined orientation comprising:
    at least one hole of defined shape in said retainer;
    a pair of projections provided in said hole for holding a roller with an axis of rotation inclined with respect to a plane defined by said retainer, said pair of projections providing a pair of contact surface portions for holding said roller in position; and
    an integral double-tapered surface provided in at least a part of an inner peripheral wall which defines said hole, said double-tapered surface forming an inwardly extending ridge for providing additional contact surface portions for holding said roller in position.

2. The retainer of claim 1 wherein said pair of projections are oppositely arranged and wherein at least a portion of said projections which contact a roller are in the plane of said plate-shaped retainer.

3. The retainer of claim 2 wherein said pair of projections are formed in predetermined directions to provide said contact surface portions.

4. The retainer of claim 2 wherein said pair of projections are formed with single-tapered ends to define said contact surface portions.

5. The retainer of claim 2 wherein a plurality of said holes are formed in said retainer as spaced apart from each other, each of said plurality of holes holding a corresponding roller.

6. The retainer of claim 5 wherein the rollers held by said retainer are arranged such that the axes of rotation of any two adjacent rollers are directed perpendicular to each other.

7. The retainer of claim 1 wherein said additional contact surface portions provided by said double tapered surface are formed by etching.

8. The retainer of claim 1 wherein:
    each retainer has a single hole for holding a single roller and wherein multiple retainers are linked together successively, and contact rollers alternately disposed therein at an inclination of 90 degrees with respect to one another.

9. The retainer of claim 8 wherein said multiple successively linked retainer are fromed to have a generally hexagonal outer shape.

* * * * *